J. ROBINSON.
Plow.
No. 36,532. Patented Sept. 23, 1862.
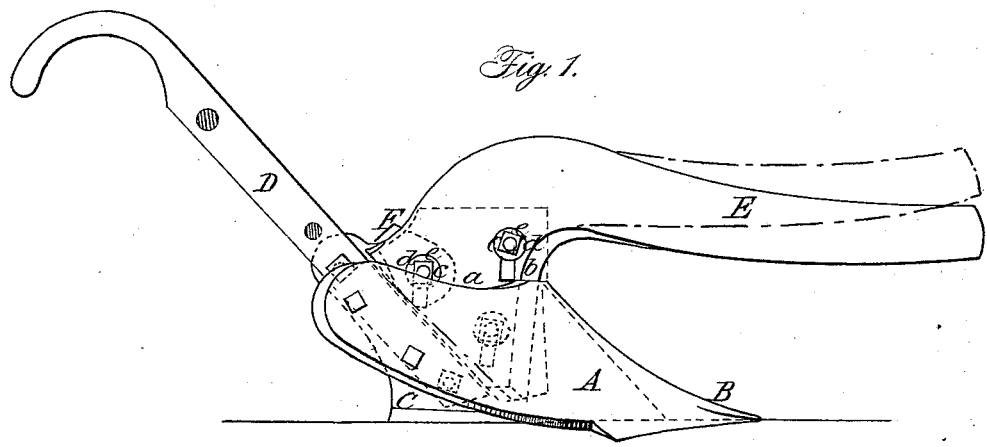
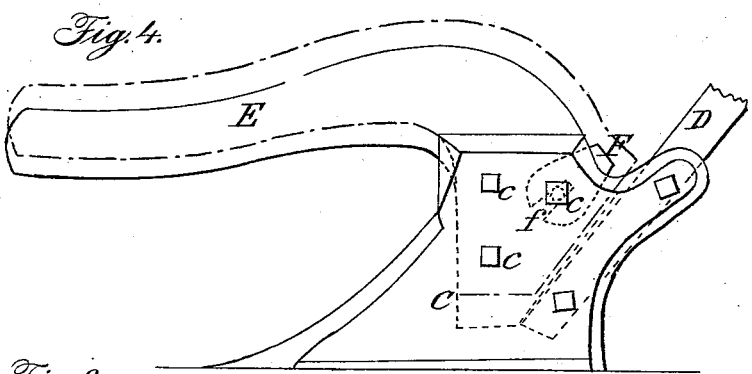
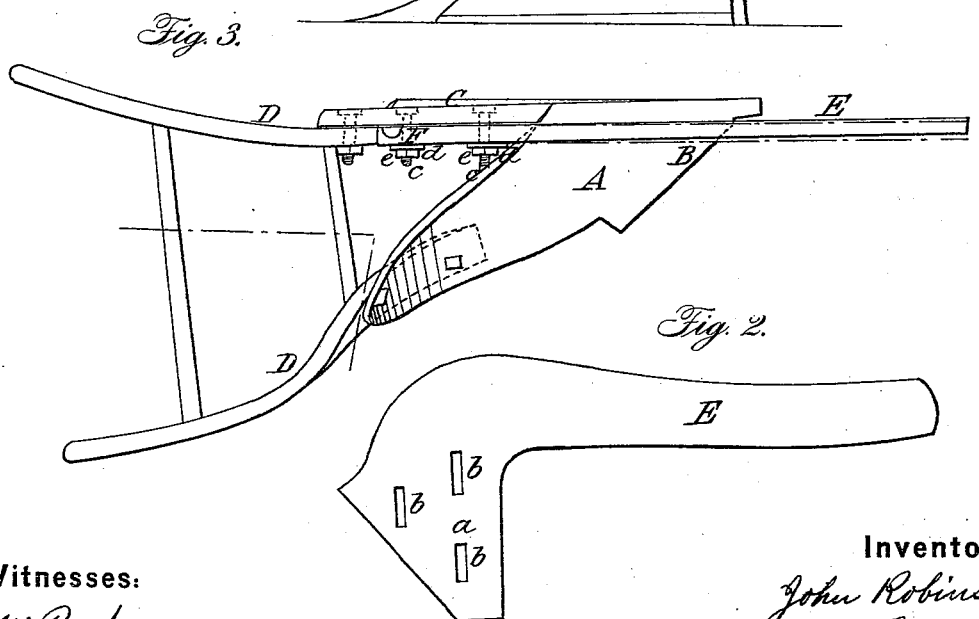
Witnesses:
G. W. Reed
Edw Hodgson
Inventor:
John Robinson
per Munn & Co
Attys

UNITED STATES PATENT OFFICE.

JOHN ROBINSON, OF HOBART, NEW YORK.

IMPROVEMENT IN PLOWS.

Specification forming part of Letters Patent No. 36,532, dated September 23, 1862.

*To all whom it may concern:*

Be it known that I, JOHN ROBINSON, of Hobart, in the county of Delaware and State of New York, have invented a new and Improved Plow; and I do hereby declare that the following is a full, clear, and exact description of the same, reference being had to the accompanying drawings, making a part of this specification, in which—

Figure 1 is a side view of my invention; Fig. 2, a detached side view of the same. Fig. 3 is a plan or top view of Fig. 1. Fig. 4 is a side view of the invention opposite to that shown in Fig. 1.

Similar letters of reference indicate corresponding parts in the several figures.

This invention relates to an improvement in that class of plows which are provided with mold-boards for turning the sod or earth in either sward or stock ground.

To enable those skilled in the art to fully understand and construct my invention, I will proceed to describe it.

A represents the mold-board, B the share, C the landside, and D D the handles, of a plow. These parts, being of usual construction, do not require a particular description.

The beam E of the plow is of metal, (cast-iron will probably be the material used,) and it may be of the usual form, with the exception of the back part, $a$, which is made in a peculiar form—viz., so as to extend vertically nearly to the bottom edge of the landside, the front part of the lower portion of the beam rising vertically, and the rear part rising in an angle corresponding to the inclination of the lower part of the handles, as shown in Fig. 4. Thus, it will be observed, that portion of the inside of the landside between the handles and the junction of the mold-board with the landside is occupied by the rear portion of the beam. This rear part, $a$, of the beam is therefore very broad, and presents a large face or resting-surface against the face of the mold-board. The bolt-holes $b$ in the part $a$ of the beam are oblong and have a vertical position, as shown clearly in Fig. 2, and the bolt-holes in the landside C, at the outer side of the latter, are countersunk, in order that the heads of the bolts may fit in the landside and be flush with its outer surface. The bolts $c$ have washers $d$ fitted on them, which bear against the part $a$ of the beam, and the nuts $e$ of the bolts are screwed up against the washers, as shown in Figs. 1 and 3. Three bolts, $c$, are shown in the drawings for securing the beam to the landside, but more may be used, if desired. The oblong bolt-holes $b$ are rather wider than the diameter of the bolts, in order to admit of the proper adjustment of the beam, as hereinafter referred to.

In order to adjust the beam E vertically and bodily in a horizontal position, the nuts $e$ are loosened or a little unscrewed, the beam raised to the desired position and the nuts $e$ screwed up snugly to the beam. (See Fig. 4, in which this adjustment is shown in red outline.) This horizontal bodily adjustment of the beam is quite an essential feature of the invention, for in case the ground to be plowed abounds in loose weeds or trash the beam may be placed or adjusted sufficiently high to prevent the back part of the beam between it and the mold-board being clogged or choked with weeds or trash—a contingency which would be sure to occur were the beam in a low position; but as a plow when its beam has relatively a low position with the mold-board runs steadier and smoother than when in high position, the beam can by my invention be readily lowered when the ground will admit of it.

In order to adjust the end or front part of the beam higher or lower, the nuts $e\ e$ of the two foremost bolts $c\ c$, are loosened or a little unscrewed, and as the bolt-holes $b$ in the beam E are made rather wider than the diameter of the bolts $c$, as previously stated, the front part of the beam may be elevated or depressed from the back bolt $c$ as a center to enable the end of the beam to be adjusted in the way stated as much as may be desired in any case to change the line of draft. In Fig. 1 this adjustment of the beam is shown in red outline. This adjustment of the beam is far preferable to the shifting of the draft-hook in a clevis at the end of the beam—the mode most generally adopted for such purpose. The beam is adjusted laterally either to the right or left by means of a wedge, F, which has a longitudinal slot, $f$, made in it to admit of the wedge fitting over the back bolt $c$ and between the beam and landside. The wedge F is made quite slightly tapering, and is adjusted by loosening the nut of the bolts farther in or out between the beam and landside, in order to shift the front part of the beam laterally. By this adjustment of the beam more or less land may be given the plow, as desired. (See Fig. 3, in which the beam is shown adjusted to the right in red outline.)

In all of the adjustments of the beam herein specified it is in line with the draft, and hence the plow is made to run or work smoother and steadier than by the use of the ordinary clevis, and in case the beam should get broken a new one may be very readily adjusted in its place.

By having the back part of the beam made in the peculiar form specified a wide and firm lateral bearing is obtained against the landside C, and I am enabled to use a cast-iron beam—a result which cannot be obtained with a narrow beam, because the bolt-holes will be in close proximity to each other, thus rendering the beam weak. By having also the vertical slots in the beam the latter may be adjusted bodily in a vertical direction without altering the inclination of the beam or changing its position in a longitudinal direction—an end which cannot be obtained by a fixed pivot nor by an oblique adjustment.

The connection of the beam with the landside forms a very essential feature in the plow, as the back part of the beam is made quite wide, extending from the front side of the handle D to the front part of the landside. A sufficient bearing is thereby obtained to prevent the racking of the beam, which is subjected to a great strain at every lateral movement of the team. A permanent or rigid connection of the beam to the plow has been the great difficulty in the way of the adoption of cast-metal beams to plows; and they have not, so far as I am aware, been hitherto used to any extent—that is to say, only those which are cast with the landside in one piece, and are therefore not adjustable. Wrought-iron beams have been employed and arranged so as to be adjustable. The nature of the material will admit of their use equally as well as the ordinary wooden beams. They, however, are comparatively expensive. The cast-iron adjustable beam could not be applied, like the wrought-iron ones, with any degree of success. The large bearing-surface must be employed, and the bolt-holes made at a considerable distance apart, so as not to weaken the beam.

The wedge F, when used in connection with the three bolts and applied as shown, admits of the lateral adjustment of the beam and the secure attachment of the beam to the plow in any position within the scope of its adjustment, for the wedge, it will be understood, is fitted upon one of the bolts, and friction is not depended upon to keep the beam in position, as would be the case were a single bolt used with the wedge inserted behind it. In my arrangement the beam, in whatever position it may be adjusted by the wedge, is as secure or as firmly held in place as if the wedge were a permanent fixture upon the landside.

Having thus described my invention, what I claim as new, and desire to secure by Letters Patent, is—

Having the rear portion of the beam E made to fill or cover that portion of the landside between the handles D and the mold-board A, in combination with the triple adjusting-slots $b$, bolts $c$, and landside C, as and for the purpose herein shown and described.

JOHN ROBINSON.

Witnesses:
W. S. FOOTE,
I. P. KNISKEN.